Aug. 29, 1939.   I. W. COX   2,170,892
MAGNETOGENERATOR
Filed April 4, 1936   3 Sheets-Sheet 1
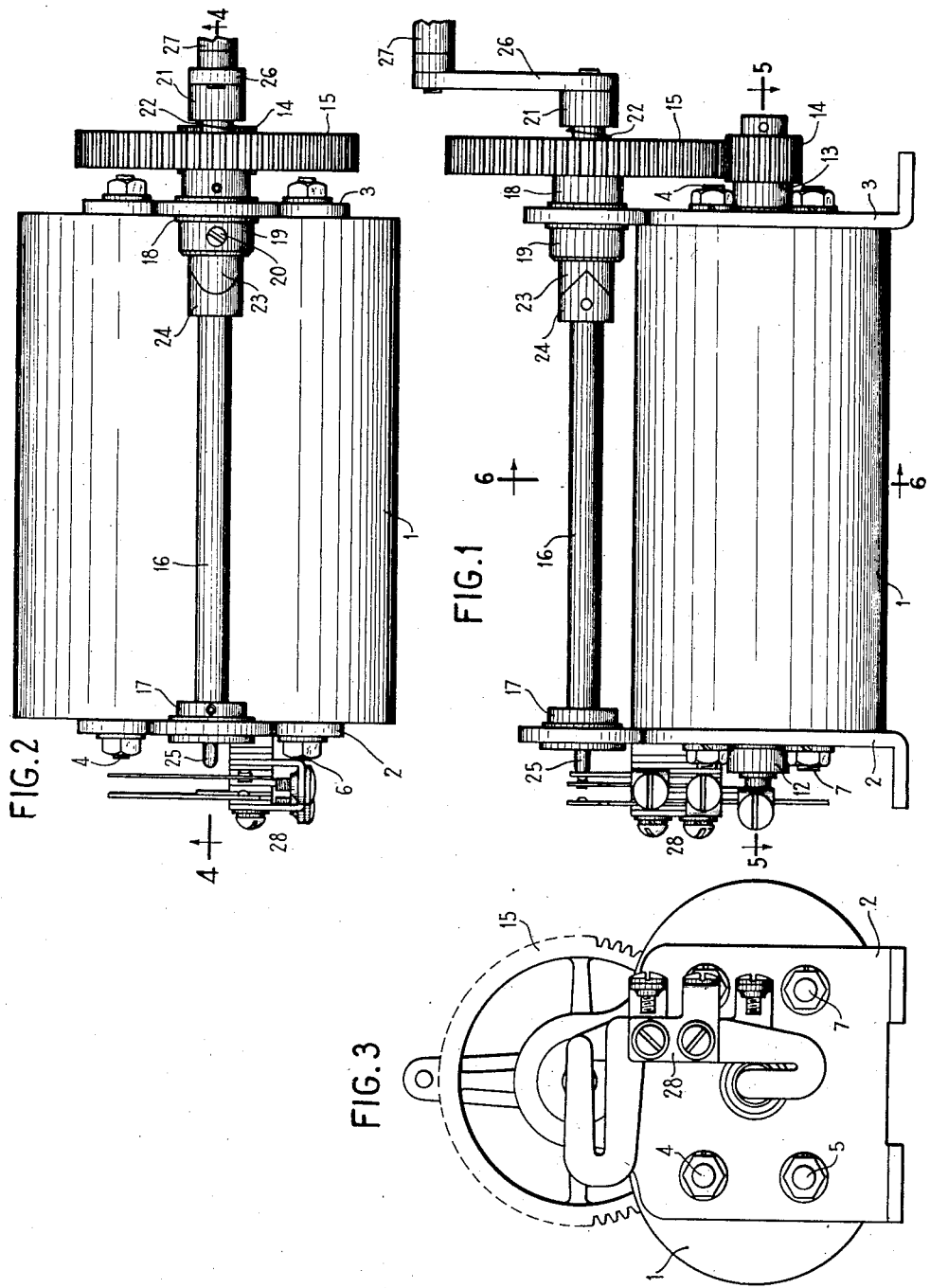
INVENTOR.
IRVIN W. COX
BY
ATTORNEY.

Aug. 29, 1939.   I. W. COX   2,170,892
MAGNETOGENERATOR
Filed April 4, 1936   3 Sheets-Sheet 2

INVENTOR.
IRVIN W. COX
BY
ATTORNEY.

Aug. 29, 1939.  I. W. COX  2,170,892
MAGNETOGENERATOR
Filed April 4, 1936  3 Sheets-Sheet 3
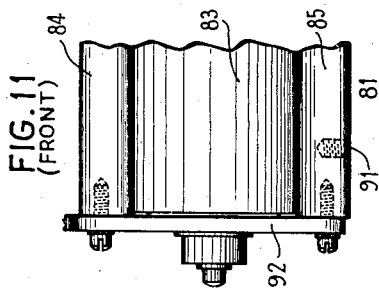
INVENTOR.
IRVIN W. COX
BY
Chas. L. Candy
ATTORNEY.

Patented Aug. 29, 1939

2,170,892

UNITED STATES PATENT OFFICE 2,170,892

MAGNETOGENERATOR

Irvin W. Cox, Chicago, Ill., assignor to Associated Electric Laboratories, Inc., Chicago, Ill., a corporation of Delaware Application April 4, 1936, Serial No. 72,713

8 Claims. (Cl. 171—209)

The present invention relates to magneto generators. Its main object is the production of a magneto generator of novel construction, employing an all-cast field structure.

GENERAL DESCRIPTION

In my prior application 63,113, February 10, 1936, a magneto generator is disclosed which makes efficient use of a cast permanent-magnet material having a very high optimum value of developed specific magneto-motive force, and capable of sustaining a high maximum field energy per unit volume of permanent-magnet material. The permanent-magnet material chosen for use in the previous application is a ferrous alloy containing in the neighborhood of 25 percent nickel, 15 to 20 percent aluminum, 2 to 4 percent cobalt, and the remainder iron. This material is first cast to the desired size and shape and is then allowed to cool, following which it is reheated in the performance of the process known as precipitation hardening. As a result, the aggregate material becomes magnetically very hard, acquiring a high coercivity. Tests after magnetization of this material show that it will develop a magneto-motive force of about 310 gilberts in the external field per lineal centimeter of magnet material with a flux density in the magnet material of about 4500 maxwells per square centimeter of cross section. From this is obtained a field-energy product of 4500 maxwells, times 310 gilberts, which is 1,395,000 gilbert-maxwells per cubic centimeter of the cast material.

In my prior application referred to, the field structure of the generator is composed of two cast magnets secured to the edges of the pair of pole shoes, the four parts enumerated enclosing an armature chamber. It is a desirable feature of the present structure that a single permanent-magnet casting replaces the four separate parts above enumerated, with a consequent reduction in the number of manufacturing operations, as well as an increase in the strength and rigidity of the assembled generator. Moreover, additional field energy may be derived from the same weight of field structure when the entire structure is effective in producing a magnetic field, whereas in previous structures the pole shoes serve merely to conduct the magnetic energy from the magnets to the armature chamber, taking no active part in setting up or sustaining the magnetic field.

It will be understood that other alloys or compounds than the one described may be used, provided they are susceptible to being formed by a casting or similar process into the desired shape and also possess a high coercivity and a sufficiently high energy-product value of the order of that set forth above.

A modified structure is disclosed which makes use of a pair of pre-cast permanent magnets onto which a pair of iron pole shoes are cast to form a substantially unitary casting. An advantage gained by the use of the modified structure is machineability of the cast-iron pole shoes, together with the practicability of drilling and tapping the pole shoes for the purpose of mounting the end plates of the structure and mounting the generator itself.

Additional objects and features of the invention will be brought out in the detail description which follows.

DETAILED DESCRIPTION

Referring now to the accompanying drawings, comprising Figs. 1 to 11, Figs. 1 to 6 show the construction of a magneto generator employing a homogeneous casting forming the entire field structure; Fig. 7 is a drawing illustrative of the preferred method of magnetizing the magnet structure of Figs. 1 to 6; Figs. 8 and 9 show a magnetizing plug used in an auxiliary magnetizing operation; and Figs. 10 and 11 show two views of a magneto generator employing pole pieces cast onto precast permanent magnets to form a unitary all-cast field structure.

*The structure of Figs. 1 to 6*

Figure 5:
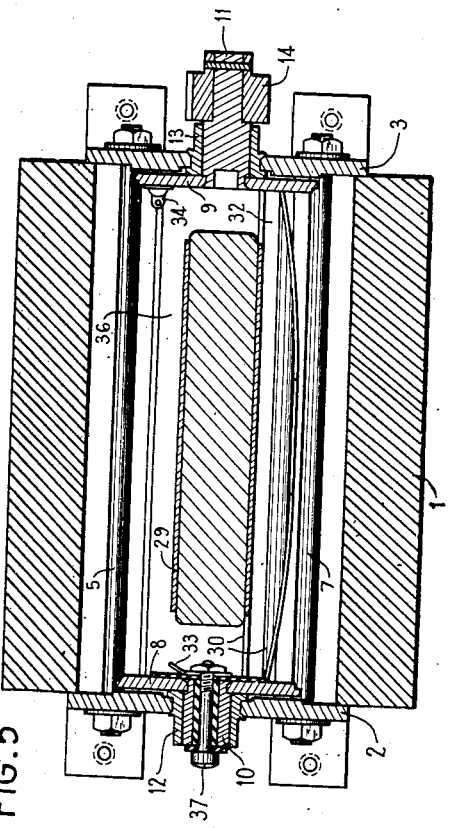
Figure 4:
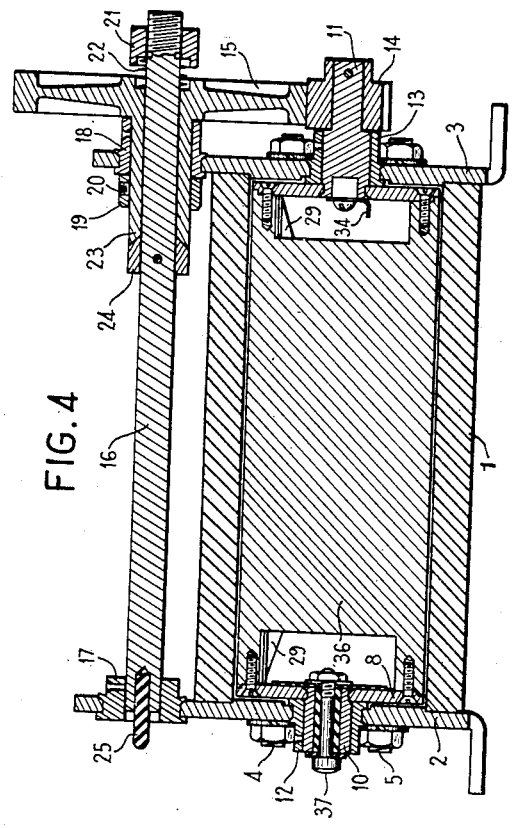
Figure 6:
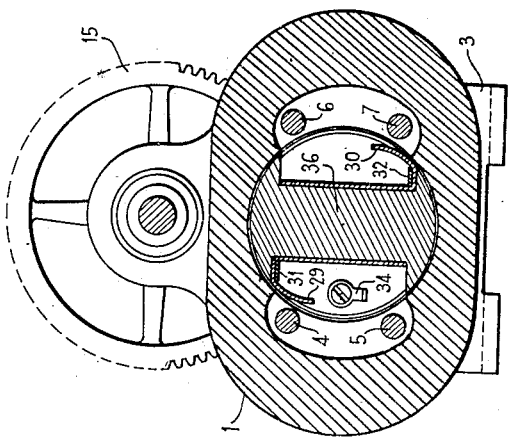

Referring now particularly to Figs. 1 to 6, Fig. 1 is a front view of a generator constructed according to the principles of the invention; Fig. 2 is a view of the generator as seen from the top; Fig. 3 is a view of the generator as seen from the left; Fig. 4 is a front sectional view taken along the line 4—4 of Fig. 2; Fig. 5 is a top sectional view taken along the line 5—5, Fig. 1; and Fig. 6 is a left section taken along the line 6—6 of Fig. 1.

The cast magnet structure 1, whose transverse cross section may be seen in Fig. 6, is a hollow body containing an armature chamber wherein the armature 36, Figs. 4 to 6, may rotate and through which the through-bolts 4 to 7 are passed to hold the end plates 2 and 3 in position. As pointed out hereinafter, the magnet casting 1 is magnetized transversely, with one pole formed on the inner surface at the slightly protruding upper pole member, seen best in Fig. 6, while the other pole is formed at the similar lower pole member. The structure thus magnetized may be considered as comprising two parallelly related permanent magnets, lying on opposite sides of a vertical plane passing through the center of the structure.

The armature 36, as is shown in Figs. 4, 5, and 6, is of the usual shuttle type of construction, allowing ample space for the armature winding. The armature is provided with circular end plates 8 and 9, into which the armature shaft members 12 and 13 are secured by an operation known as "staking".

In addition to the cast field structure 1, the main structure of the generator includes the end plates 2 and 3, which are held in place by means of the through-bolts 4 to 7, seen in cross-section in Fig. 6. Each of the end plates 2 and 3 is machined so as to leave an integral disc on the inside surface thereof concentric with the armature shaft, which disc serves to fix the location of the end plate with respect to the inner surfaces of the integral pole shoes of the casting 1, whereby the armature is accurately spaced between the formed poles of the permanent-magnet structure. The shaft bearings 12 and 13 are staked into end plates 2 and 3, and they are proportioned so as to space the armature assembly longitudinally within the armature chamber.

The armature has been shown unwound for the sake of simplicity. One end of the completed winding of the armature may be secured to the lug 34, held in engagement with armature end plate 9 by means of a screw, while the other end of the armature winding may be secured to lug 33, Fig. 5, which is held in electrical contact with the associated insulated stud 37.

Bearings 17 and 18 for the crank shaft 16 and for the sleeve 23, formed integrally with the driving gear 22, are staked in the end plates 7 and 8, as shown. The crankshaft stop-collar 21, threaded on the inside, is screwed onto the end of the crank shaft 16 to limit the endwise movement of the crank shaft imparted by the interaction between cam collar 24 (see Figs. 1 and 2) and the thrust cam cut in the end of sleeve 23. Cam collar 24 is held in position by a pin passing through the shaft 16, as may be seen in Figs. 1 and 4. The endwise movement of crank shaft 18 referred to takes place when crank shaft 26 is turned by the handle 31, in order to shift the spring combination forming part of spring assembly 28 by means of the thrust action of buffer 25, composed of insulating material and fitted snugly in a hole in the end of crank shaft 16. The coiled spring 22 restores the crank shaft 16 endwise to the position shown in the drawings when the crank is released. The assembly composed of the crank shaft 16 and the driving wheel 15 is held in position by collar 19, secured to sleeve 23 by the headless set screw 20, Figs. 2 and 4.

Armature pinion 14 is fitted over the end of shaft member 11 and is secured in place by a pin.

The spring assembly 28, as is seen in Figs. 1 to 3, is mounted on the end plate 2. This spring assembly is provided with a spring to contact the insulated stud 37, Figs. 4 and 5, through which armature current is carried to the external circuit, and with additional springs to perform the usual switching operations as in common practice in signalling systems.

Keeping in mind that the cast material of which casting 1 is made is sufficiently hard to render machining impracticable, it will be understood that it is highly desirable that the casting be done accurately, as the finishing of the casting can be done practically only by a grinding operation. If the produced casting is one having a rough finish, the ends may be ground smooth and accurately trued in order that the end plates 2 and 3 be accurately spaced and parallel to each other. In addition, an internal grinding operation may bring the inter-pole-shoe diameter to the required measurements, in addition to rendering the inner pole faces smooth. On the other hand, the structure 1 may be die-cast in which case no grinding operation is necessary.

In order to enable the generator to be operated more smoothly and to enable the armature to be started into rotation more easily, the armature is provided with a pair of auxiliary flux members 29 and 30, seen best in cross-section in Fig. 6. These members are laid in place as shown in Fig. 6 before the armature is wound, each being of an L-shaped cross-section when placed in position. After the armature is wound, the outer portions of the flux members 29 and 30 are bent substantially as indicated in Fig. 6, the steel form-plates 31 and 32 being provided to give stiffness to the structure and to enable the members 29 and 30 to be bent readily along desired line. The following edges of the outer portions of members 29 and 30 may be held down to the completed winding by taping or tying.

The armature 36 rotated in a clockwise direction as seen in Fig. 6, responsive to rotation of the generator by means of the crank. The outer portions of the flux members 29 and 30, therefore, form magnetic extensions of the trailing edges of armature 36. Because each is bent so that the tip thereof is closer to the center of the armature than the remainder of the curved portion, they serve to provide a somewhat gradual break of the magnetic circuit as the armature is rotated. It may be pointed out that this arrangement permits a much more powerful generator to be turned readily by hand than can be turned readily by hand with a normal construction of the armature and formed pole shoes.

In order to still further aid the breaking away of the trailing armature edges, the curved portion of each of the flux members 29 and 30 may be cut so that the width decreases sharply toward the trailing edge, as may be seen in Fig. 4 for the flux member 29 and in Fig. 5 for the flux member 30. With this added provision, there is no definite sharp decrease in magnetic flux as the armature is turned, as the flux is brought to a low value by the time the trailing edges of the flux members pass from the edges of the formed pole shoes of the magnet 1, the uniform reduction being occasioned both by the relatively small radius of curvature of the outer portions of members 29 and 30, and by the decreasing width introduced by the outline form of the exposed portions of the flux members.

*Magnetizing and assembling*

The casting 1 is magnetized by a magnetizer as indicated in Fig. 7, and an auxiliary magnetization is accomplished by the auxiliary magnetizing plug 64 of which Fig. 8 is a front view and Fig. 9 a cross-sectional view taken along the line 9—9, Fig. 8.

The plug 64 comprises essentially a winding 66 and an iron core 65 of substantially the same diameter as the armature of the generator and having oppositely disposed lateral channels cut therein to increase the winding space and to enable the winding to be held in place. The plug 64 also has a deep groove cut in the right-hand end thereof as seen in Fig. 8, leaving the illustrated pair of protruding arms 69 and 70, whose purpose will be brought out subsequently. The non-magnetic yoke 67 is secured to the opposite end of the plug 64 and is provided with a hole through which the two conductor cord 68 passes, through which cord energizing current may be passed to the windings.

It is to be noted that the winding 66 protrudes on both sides of the plug, giving the plug a greater width than the inter-pole distance of the casting 1. When the plug 64 is introduced into the casting, the major part of the winding 66 lies within the space through which the through-bolts 4 to 7 pass as seen in Fig. 6. By utilizing this space, sufficient winding may be placed on the plug 64 to enable the plug to be very strongly magnetized.

The magnetizer shown in Fig. 7 comprises essentially a pair of magnet spools 51 and 52 composed of windings on the cores 53 and 54, together with a return yoke 55. In addition, the magnetizer has the fixed pole piece 57 secured to the upper end of core 54 by bolts 60 and 61. It has also the adjustable pole piece 56 held in place by bolts 58 and 59, passing through slots 62 and 63.

When the casting 1 is to be magnetized, it is placed in the magnetizer as shown in Fig. 7 with the pole pieces 56 and 57 centrally in contact with the flat sides of the casting. The auxiliary magnetizing plug 68 is placed within the casting.

The current may now be turned on the spool windings of the magnetizer and the connection may remain closed until the current has built up to its maximum value, at which time a high magneto-motive force is developed across the flat sides of the casting 1. A small part of the flux is diverted through the central iron web of the magnetizing plug 64, but the magnetizer is so designed as to apply sufficient flux nevertheless to substantially saturate the parallel arms of the casting, shown best in cross-section in Fig. 6. As a result of this operation, however, the poles of the magnetized castings are developed on the outside, whereas it is preferable that the poles be developed on the inner surfaces of the formed pole shoes. In order to effect this, current is applied to the winding of the magnetizing plug 64, through the cord 68, while the current is still flowing through the windings of spools 51 and 52 of the magnetizer. Then, while current is still flowing through the winding 66 of the magnetizing plug 64, the supply of current to the windings of the magnetizer is discontinued, following which the casting 1 is removed from the magnetizer, and then the current supplied to the winding of the auxiliary magnetizing plug is discontinued. By this auxiliary magnetizing operation, the free poles of the structure are shifted from the flat outside surfaces to the curved inner surfaces of the formed pole pieces because of the considerable magneto-motive force developed when current is applied to the winding 66 of the auxiliary magnetizing plug 64.

A modified method of procedure in magnetizing the structure consists in placing the casting 1 in the magnetizer as shown in Fig. 7 and in applying the main magnetization by means of the magnetizer before the plug 64 is inserted. This enables a magnetizer of somewhat less power to be used, as the leakage flux path across the armature chamber through the iron core 65 of the plug 64 is not present when the main magnetization process is being accomplished. The plug 64 may next be inserted as shown in Fig. 7, but the current flow in the winding of the magnetizer is preferably discontinued before this is done on account of the difficulty in inserting the plug with the power turned on the magnetizer. The casting 1, however, is permitted to remain in the magnetizer until the plug has been inserted and the current flow has been built up through the winding of the plug in order to avoid subjecting the magnetized structure to the coercive influence of a non-ferrous external flux path.

When the structure has been magnetized by the foregoing method, and the poles have been formed on the inside as desired, the auxiliary magnetizing plug 64 may be withdrawn. However, if the magnetizing plug is merely withdrawn without simultaneously inserting some other member to form a good inter-pole flux path in the armature chamber, severe self-coercion of the magnetized structure takes place which may lower the magnetic strength as much as 25 percent. Therefore, the plug 64 is removed by pushing it out by means of the armature 36, turned so that the poles thereof coincide with the formed poles on the inside of the casting. In order to push the plug 64 out of the armature chamber, the left end of the armature 36, as seen in cross-section in Fig. 4 is placed against the ends of the pole extensions 69 and 70 of the magnetizing plug 64. These pole extensions are sufficiently long that the end of contact stud 37 does not damage the winding 66. At the same time, these pole extensions form a magnetic path so that the only gap introduced is that caused by the armature end of plate 8, Fig. 4. It has been found that the interposition of the non-magnetic end plate 8 between the end of armature 36 and the ends of the pole extensions 69 and 70 of the magnetizing plug causes no measurable harm.

With the procedure just outlined, the armature of the generator is introduced to serve as a low-reluctance flux path in the armature chamber as the auxiliary magnetizing plug is removed, whereby the armature is substituted as a keeper simultaneously with the removal of the auxiliary magnetizing plug.

With the structure and plug illustrated, it was found that the plug alone is sufficient to magnetize the structure when current approaching the burn-out value is used momentarily.

Following the insertion of the armature, and the simultaneous removal of the magnetizing plug, the assembly of the generator may be completed in a manner which will be apparent from the description of Figs. 1 to 6 given hereinbefore.

*The modified structure, Figs. 10 and 11*

As previously mentioned, Figs. 10 and 11 illustrate a magneto generator with a modified form of all-cast field structure. Fig. 10 is a view of the left end of the generator, with the left end-plate removed from the generator and with the left end-plate removed from the armature 36'. The field structure of this generator consists of a casting, composed, however, of four pieces more or less fused together and interlocked, as may be seen best in Fig. 10. Since the material of which the permanent magnet pieces 82 and 83 are composed has a higher melting point than cast iron, the pieces 82 and 83 are first cast, with the illustrated configuration which will permit of interlocking with the pole shoes 84 and 85 when the pole shoes are subsequently cast onto the magnet pieces 82 and 83. As may be seen in Fig. 11, the pole shoes 84 and 85 are slightly longer than the magnet pieces 82 and 83, whereby the pole shoes may be machine finished after casting without interference by the unmachineable magnet pieces 82 and 83. The clearance, however, need be only a trifle, so that the armature chamber is substantially enclosed by the end plates of the generator.

In addition to the machining of the end faces of pole shoes 84 and 85, the inner surfaces of the pole shoes may be accurately machined, or bored, to render the armature chamber smooth and of the desired diameter. Moreover, four holes for mounting the generator may be drilled in the bottom of pole shoe 85, of which the mounting holes 90 and 91 are indicated in dotted outline in Fig. 10. Further, the pole shoes may be drilled and tapped, as at 86 to 89, to permit the end plates of the generator such as 92 and 93 to be secured to the field structure by machine screws, as indicated in Fig. 11.

Keeping in mind that the armature 36' of the generator turns in a clockwise direction, as viewed in Fig. 10, it will be noted that the edges of the pole shoes 84 and 85 from which the trailing armature edges break away are formed so as to cause the break to come gradually. This forming may be done partly during the casting operation and then completed to the desired curvature by a subsequent auxiliary machining operation following the finish-boring of the armature chamber.

*Magnetizing the modified structure*

In the production of a magneto generator using the modified structure shown in Figs. 10 and 11, the field magnets 82 and 83 may be magnetized before the assembly of the generator by being placed in association with a magnetizer in the manner illustrated in Fig. 7. It is to be noted that an auxiliary magnetizing plug is not needed with the structure of Figs. 10 and 11, as the pole shoes 84 and 85 have insufficient permanent-magnet qualities to form permanent poles. However, the armature of the generator should be placed in the armature chamber before the magnetizing operation, or else before the magnetized structure has been removed from the magnetizer, in order to avoid subjecting the newly magnetized permanent magnets to undue self-coercion, as hereinbefore pointed out.

Alternatively, the magnetization of the modified structure may be carried out after the generator is completely assembled except for the crank shaft. The magnetizing is then carried on by utilizing a magnetizer having one pole formed somewhat as described in my prior application, hereinbefore referred to. A specially formed pole piece is required, it will be appreciated, in order that the protruding end plates of the partly assembled generator may clear the pole piece, and the pole piece is preferably provided with channels to admit the bearing insert, while permitting the pole piece to otherwise be as wide as the space between the end plates of the generator.

*Ageing and testing*

In order to insure that the manufactured generators have uniform characteristics which will not alter materially responsive to their usage, it is proposed that each generator after assembly be operated for some time, generating into a short circuit load, as this is considered to be about the most severe service condition that may arise. A test made after this operation may be depended upon to indicate the performance of the generator under even the most adverse service ordinarily encountered. This method of procedure is more fully discussed in my prior application hereinbefore referred to.

What is claimed is:

1. In a generator having an armature comprising a magnetic cylinder journalled for rotation about its longitudinal axis and having a winding groove extending longitudinally of the cylinder, and a strip of magnetic material laid in the winding groove and extending out over the finished winding, the exposed portion of said strip being so shaped that a smooth gradual diminution of flux occurs as the trailing edge of the associated inter-groove portion of the armature is rotated away from a pole shoe of the generator.

2. The method of magnetiding a hollow body of permanent-magnet material which comprises applying a magnetizing force across the body from without and thereafter applying an auxiliary magnetizing force to the body from within to shift the developed poles toward the inner surface.

3. The method of magnetizing a ring type permanent magnet suitable for a magneto generator, which comprises applying a magnetizing force from outside the ring structure to produce opposite magnetic poles, applying a magnetizing force from inside the ring structure, and causing the last mentioned force to shift the established poles toward the inner surface of the ring structure.

4. The method of magnetizing a ring type permanent magnet suitable for a magneto generator, which comprises in generating a magneteic flux outside the ring structure, passing said flux through the ring structure to produce magnetic poles manifested principally at opposite points on the exterior of the ring structure, generating a magnetic flux inside the ring structure, passing said last mentioned flux through said ring structure in the same direction as the flux due to the established magnetization, and causing said last mentioned flux to shift the said poles toward the interior of the ring structure.

5. In a magneto generator having a ring type permanent magnet and an armature rotatable therein, the method of magnetizing the permanent magnet which comprises inserting a soft iron core in the armature space, magnetizing said core to drive flux through the permanent magnet and magnetize the same, and retaining the established magnetization undiminished by self coercion by simultaneously withdrawing said core and inserting said armature.

6. In a magneto generator having a ring type permanent magnet and an armature rotatable therein, the method of magnetizing the permanent magnet which comprises inserting a keeper of soft iron in the armature space, temporarily applying a magnetizing force from outside the magnet sufficiently powerful to saturate both the magnet and the keeper, temporarily magnetizing the keeper to shift the established magnetic poles toward the armature space, and in simultaneously inserting the armature and withdrawing the keeper.

7. In a generator, a magnetized field structure comprising an even number of pole faces, an armature arranged for rotation relative to said pole faces and also comprising said even number of pole faces, said armature having winding grooves alternated with the pole faces thereof, and means comprising an element of magnetic material secured in one of said winding grooves and having a portion lying over the winding space of said groove for preventing an abrupt diminution of the flux passing through said armature as the pole faces of said armature are rotated away from the pole faces of said field structure.

8. The method of magnetizing a ring of magnetic material to form a permanent magnet which comprises applying a magnetizing force to said ring to produce opposite magnetic poles along the outer surface thereof, and applying a secondary magnetizing force to said ring to shift the established poles to the inner surface of said ring.

IRVIN W. COX.